US 11,378,847 B2

(12) United States Patent
Jiang et al.

(10) Patent No.: US 11,378,847 B2
(45) Date of Patent: Jul. 5, 2022

(54) ARRAY SUBSTRATE, DISPLAY PANEL, AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Liangliang Jiang, Beijing (CN); Renxu Lin, Beijing (CN); Mookeun Shin, Beijing (CN); Yong Jun Yoon, Beijing (CN)

(73) Assignees: BOE TECHNOLOGY GROUP CO., LTD., Beijing (CN); HEFEI XINSHENG OPTOELECTRONICS TECHNOLOGY CO., LTD, Anhui (CN)

( * ) Notice: Subject to any disclaimer, the term of this patent is extended or adjusted under 35 U.S.C. 154(b) by 848 days.

(21) Appl. No.: 15/778,440

(22) PCT Filed: Sep. 29, 2017

(86) PCT No.: PCT/CN2017/104321
§ 371 (c)(1),
(2) Date: May 23, 2018

(87) PCT Pub. No.: WO2018/176776
PCT Pub. Date: Oct. 4, 2018

(65) Prior Publication Data
US 2021/0165287 A1 Jun. 3, 2021

(30) Foreign Application Priority Data
Mar. 27, 2017 (CN) .......................... 201710189501.2

(51) Int. Cl.
*G02F 1/1343* (2006.01)
*G02F 1/1333* (2006.01)
(Continued)

(52) U.S. Cl.
CPC .................. *G02F 1/134309* (2013.01); *G02F 1/133357* (2021.01); *G02F 1/133514* (2013.01); *G02F 1/133707* (2013.01)

(58) Field of Classification Search
CPC ..................... G02F 1/133707; G02F 1/133514
See application file for complete search history.

(56) References Cited

U.S. PATENT DOCUMENTS

2008/0143897 A1* 6/2008 Chang ............... G02F 1/134363
349/33
2014/0168593 A1 6/2014 Wang et al.
(Continued)

FOREIGN PATENT DOCUMENTS

CN 102998860 A 3/2013
CN 103645590 A 3/2014
(Continued)

OTHER PUBLICATIONS

International Search Report and Written Opinion dated Jan. 15, 2018; PCT/CN2017/104321.
The First Chinese Office Action dated Feb. 26, 2019; Appln. No. 201710189501.2.

*Primary Examiner* — Jessica M Merlin (57) ABSTRACT

An array substrate, a display panel, and a display device are provided. In the array substrate, each of the pixel units includes a first pixel region and a second pixel region. The array substrate includes an alignment film located on the base substrate, a plurality of first electrode strips located in the first pixel region, and a plurality of second electrode strips located in the second pixel region. The alignment film has a first alignment direction and a second alignment
(Continued)

direction. An extension direction of the first electrode strip and the first alignment direction have a first included angle, an extension direction of the second electrode strip and the second alignment direction have a second included angle, and the first included angle is less than the second included angle.

12 Claims, 5 Drawing Sheets

(51) Int. Cl.
    *G02F 1/1335*      (2006.01)
    *G02F 1/1337*      (2006.01)

(56) References Cited

U.S. PATENT DOCUMENTS

| | | |
|---|---|---|
| 2015/0124207 A1 | 5/2015 | Itou et al. |
| 2016/0011458 A1 | 1/2016 | Xu et al. |
| 2016/0187731 A1* | 6/2016 | Li .................. G02F 1/133753 349/129 |
| 2016/0238883 A1 | 8/2016 | Yao et al. |
| 2017/0160584 A1 | 6/2017 | Song et al. |
| 2018/0004029 A1* | 1/2018 | Yonemura ........... G02F 1/13439 |

FOREIGN PATENT DOCUMENTS

| | | |
|---|---|---|
| CN | 104483781 A | 4/2015 |
| CN | 104597676 A | 5/2015 |
| CN | 104730754 A | 6/2015 |
| CN | 105093723 A | 11/2015 |
| CN | 106707627 A | 5/2017 |

\* cited by examiner

ARRAY SUBSTRATE, DISPLAY PANEL, AND DISPLAY DEVICE

The application claims priority to the Chinese patent application No. 201710189501.2, filed on Mar. 27, 2017, the entire disclosure of which is incorporated herein by reference as part of the present application.

TECHNICAL FIELD

At least one embodiment of the present disclosure relates to an array substrate, a display panel, and a display device.

BACKGROUND

With the development of liquid crystal display technology, thin film transistor liquid crystal displays (TFT-LCDs) have been widely used in electronic products such as LCD TVs, mobile phones, and computers because of their advantages such as having high resolution, power saving, and thin thickness and light weight. TFT-LCD is a passive light-emitting display device. The liquid crystal molecules cannot emit light by themselves. Along with a backlight source, they can achieve the control of light intensity of the backlight source by controlling the rotation thereof, and then achieve displaying a full color image and controlling the gray scale through a filtering effect of a color filter. The RGBW (red, green, blue, and white) four-color display technology adds a highly transparent W (white) sub-pixel to a conventional RGB (red, green, blue) pixel to form an RGBW pixel structure. The RGBW four-color display technology has the advantages of improving the light transmittance of the liquid crystal panel, reducing power consumption, and improving brightness. However, the transmittance of the W sub-pixel and the transmittance of the RGB sub-pixel greatly differ from each other, resulting being prone to generate undesirable phenomena such as gray scale and uneven brightness in a display device having an RGBW pixel structure.

SUMMARY

At least one embodiment of the present disclosure provides an array substrate, a display panel, and a display device. In the array substrate, an included angle between an alignment direction of an alignment film and an extension direction of an electrode strip is different in different sub-pixel regions of the pixel unit, so that the included angle in a white sub-pixel region is larger than that in a color sub-pixel region, and under the premise of without changing the aperture ratio of each sub-pixel, the proportion of the brightness of white sub-pixels to the overall brightness is reduced, thereby effectively improving the gray scale, improving the contrast and the display quality, improving the product quality, and improving the brightness uniformity of the display panel adopting the array substrate.

At least one embodiment of the present disclosure provides an array substrate comprising: a base substrate and an alignment film located on the base substrate, wherein, the array substrate comprises a plurality of pixel units, each of the pixel units comprises a first pixel region and a second pixel region, and a first slit electrode is located in the first pixel region, a second slit electrode is located in the second pixel region, the first slit electrode comprises a plurality of first electrode strips, and the second slit electrode comprises a plurality of second electrode strips; the alignment film located in the first pixel region has a first alignment direction, and the alignment film located in the second pixel region has a second alignment direction; an extension direction of each of the plurality of first electrode strips and the first alignment direction have a first included angle, and an extension direction of each of the plurality of second electrode strips and the second alignment direction have a second included angle, the first included angle and the second included angle are both greater than or equal to 0° and less than or equal to 90°, and the first included angle is less than the second included angle.

For example, in the array substrate provided by at least one embodiment of the present disclosure, the first alignment direction and the second alignment direction are the same.

For example, in the array substrate provided by at least one embodiment of the present disclosure, the extension direction of each of the plurality of first electrode strips is the same as the extension direction of each of the plurality of second electrode strips.

For example, in the array substrate provided by at least one embodiment of the present disclosure, the extension direction of each of the plurality of first electrode strips and the extension direction of each of the plurality of second electrode strips are different, and the first alignment direction and the second alignment direction are different.

For example, in the array substrate provided by at least one embodiment of the present disclosure, the first pixel region is a color sub-pixel region, and the second pixel region is a white sub-pixel region.

For example, in the array substrate provided by at least one embodiment of the present disclosure, the color sub-pixel region comprises any one selected from the group consisting of a red sub-pixel region, a green sub-pixel region, and a blue sub-pixel region.

For example, in the array substrate provided by at least one embodiment of the present disclosure, the extension direction of each of the plurality of first electrode strips in the red sub-pixel region, the extension direction of each of the plurality of first electrode strips in the green sub-pixel region, and the extension direction of each of the plurality of first electrode strips in the blue sub-pixel region are the same.

For example, in the array substrate provided by at least one embodiment of the present disclosure, the first slit electrode and the second slit electrode are pixel electrodes.

For example, in the array substrate provided by at least one embodiment of the present disclosure, the first pixel region comprises a first domain and a second domain, and the second pixel region comprises a third domain and a fourth domain; the plurality of first electrode strips of the first domain is in mirror symmetry with the plurality of first electrode strips of the second domain, and the plurality of second electrode strips of the third domain is in mirror symmetry with the plurality of second electrode strips of the fourth domain.

At least one embodiment of the present disclosure provides a display panel comprising: a first display substrate and a second display substrate, wherein the first display substrate is any one of the array substrates as mentioned above.

For example, in the display panel provided by at least one embodiment of the present disclosure, the second display substrate is a color filter substrate, and in a direction perpendicular to the second display substrate, a filter layer is provided at a position of the second display substrate corresponding to the first pixel region.

For example, in the display panel provided by at least one embodiment of the present disclosure, the second display substrate further comprises a planarization layer located on the filter layer.

For example, in the display panel provided by at least one embodiment of the present disclosure, a distance between a surface of the planarization layer corresponding to the first pixel region and a surface of the base substrate facing the second display substrate is less than or equal to a distance between a surface of the planarization layer corresponding to the second pixel region and a surface of the base substrate facing the second display substrate.

For example, in the display panel provided by at least one embodiment of the present disclosure, the filter layer comprises a red filter sub-layer, a green filter sub-layer, and a blue filter sub-layer.

At least one embodiment of the present disclosure provides a display device comprising any one of the display panels as mentioned above.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. "On," "under," "right," "left" and the like are only used to indicate relative position relationship, and when the position of the object which is described is changed, the relative position relationship may be changed accordingly.

The components or structures in the drawings are not strictly drawn to scale, and for clarity, the dimensions of the individual component or structure may be exaggerated or reduced, but these should not be used to limit the scope of the disclosure. In order to keep the following description of the embodiments of the present disclosure clear and concise, the present disclosure omits detailed descriptions of known functions and known components.

With respect to a display device with a color filter, about one-third of the light of the backlight is consumed on the color filter, so that the light transmittance of the display device is small. The RGBW (red, green, blue and white) four-color display technology adds a W (white) sub-pixel which does not require light filter on the basis of three sub-pixels of RGB (red, green, and blue), resulting in relatively high light transmittance of the display device, RGBW four-color display technology has gradually become the main means for increasing transmittance in liquid crystal display devices. The RGBW four-color display technology can effectively improve the transmittance of the display device and reduce the backlight brightness and power consumption of the display device. On the other hand, by increasing the W sub-pixel, the color density and brightness of a single pixel can be adjusted more precisely, and the transition color is added to make the color level more distinct and the color display more abundant.

In the RGBW display device, a planarization layer coated on the color filter layer is mainly used to fill the aperture part of the W sub-pixel, so that the process of separately filling the aperture part of the W sub-pixel is omitted, and a mask plate is saved, thereby saving production cost and reducing production time.

Figure 1A:
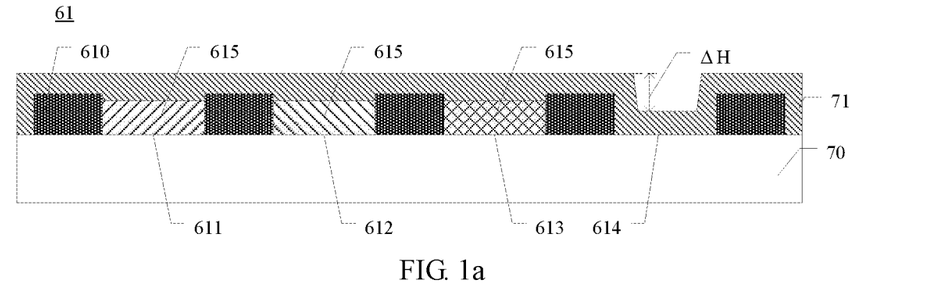
FIG. 1a is a schematic structural diagram of a section of a color filter substrate of an RGBW liquid crystal display panel.

FIG. 1a illustrates a schematic structural diagram of a section of a structure of a color filter substrate of an RGBW liquid crystal display panel. As illustrated in FIG. 1a, the color filter substrate 61 includes a glass substrate 70. A black matrix 610 and aperture parts of sub-pixel regions of the black matrix 610 are provided on the glass substrate 70. The aperture part 614 of a W sub-pixel region is directly filled with a planarization layer 71, and the aperture part 611 of an R sub-pixel region, the aperture part 612 of a G sub-pixel region, and the aperture part 613 of a B sub-pixel region are formed by a filter layer 615 and a planarization layer 71. Because the black matrix 610, the filter layer 615, and the planarization layer 71 each have a certain film thickness, there is a pixel step difference between the aperture part of the W sub-pixel region and the aperture part of the R sub-pixel region, the G sub-pixel region, and the B sub-pixel region. And the pixel step difference ΔH is about 0.2-0.5 μm.

Figure 1B:
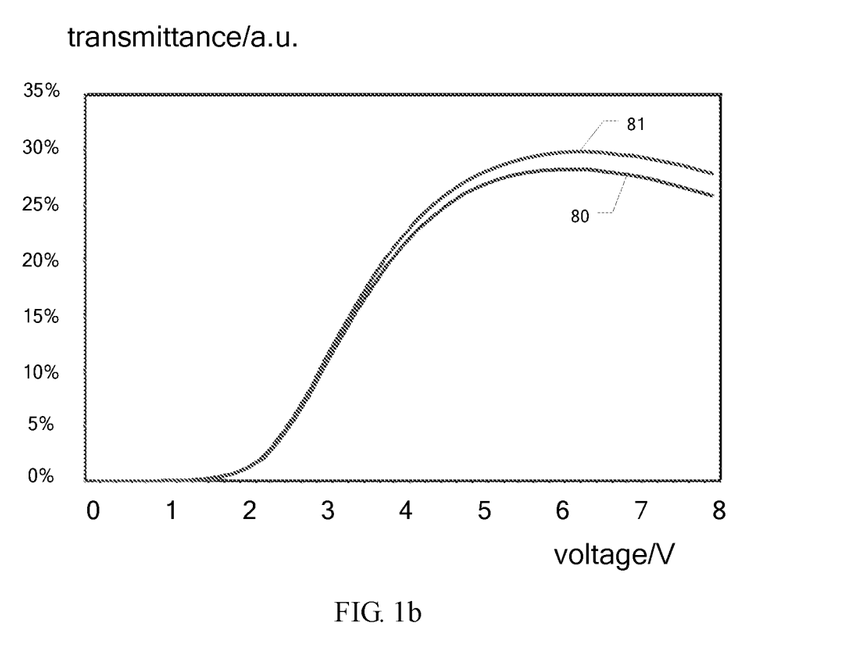
FIG. 1b is a schematic diagram of a simulation curve of transmittance of liquid crystal molecules of the display panel in a liquid crystal cell with different thicknesses.

FIG. 1b illustrates a schematic diagram of a simulated curve of transmittance of liquid crystal molecules of a display panel with different liquid crystal cell thicknesses. The liquid crystal light effect (i.e., transmittance of liquid crystal molecules) simulation study illustrates that for the same pixel structure, the transmittance of liquid crystal molecules is positively related to the thickness of the liquid crystal cell, that is, the transmittance of liquid crystal molecules increases as the thickness of the liquid crystal cell increases. As illustrated in FIG. 1b, a curve 80 refers to the transmittance of liquid crystal molecules of the display panel with a liquid crystal cell thickness of 3.3 µm at different voltages; a curve 81 refers to the transmittance of liquid crystal molecules of the display panel with a liquid crystal cell thickness of 3.5 µm at different voltages. At the same voltage, the transmittance of liquid crystal molecules illustrated by the curve 80 is lower than the transmittance of liquid crystal molecules illustrated by the curve 81. For example, upon the applied voltage being 6V and the liquid crystal cell thickness is 3.3 µm, the transmittance of the liquid crystal molecules is about 27%, and if the liquid crystal cell thickness is 3.5 µm, the transmittance of the liquid crystal molecules is about 30%.

Figure 1C:
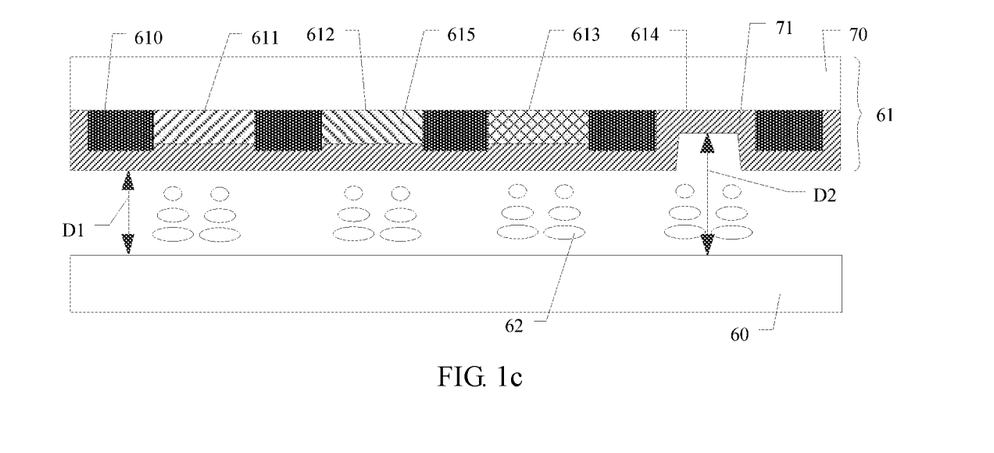
FIG. 1c is a schematic structural diagram of a section of a structure of an RGBW liquid crystal display panel.

FIG. 1c illustrates a schematic cross-sectional view of an RGBW liquid crystal display panel. As illustrated in FIG. 1c, the RGBW liquid crystal display panel includes an array substrate 60, a color filter substrate 61, and liquid crystal molecules 62 located between the array substrate 60 and the color filter substrate 61. In the RGB sub-pixel region, a distance between a surface of the planarization layer 71 and a surface of the array substrate 60 facing the color filter substrate 61 is D1. In the W sub-pixel region, a distance between the surface of the planarization layer 71 and the surface of the array substrate 60 facing the color filter substrate 61 is D2. D1 is less than D2. That is, the liquid crystal cell thickness in the W sub-pixel region is larger than the liquid crystal cell thickness in the RGB sub-pixel region, resulting in a higher transmittance of the liquid crystal molecules 62 in the W sub-pixel region than in the RGB sub-pixel region, thereby further increasing the proportion of white light in each pixel unit. As a result, upon an image being displayed, unfavorable phenomena such as grayscale unevenness and uneven brightness occur on the display panel. If the brightness and transmittance of the W sub-pixel are reduced by reducing the aperture ratio of the aperture part of the W sub-pixel, unfavorable phenomena such as poor brightness at a periodically fixed position and poor image quality tends to occur on the display panel.

Figure 1D:
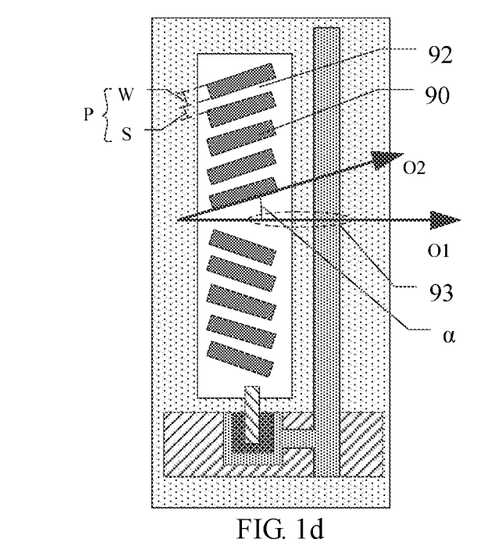
FIG. 1d is a schematic diagram of a pixel structure design and a liquid crystal arrangement.

FIG. 1d illustrates a schematic diagram of a pixel structure design and a liquid crystal arrangement. As illustrated in FIG. 1d, each sub-pixel region of the pixel unit can include a plurality of slit electrodes. Each of the slit electrodes includes a plurality of electrode strips 92. Adjacent electrode strips 92 are spaced apart by a slit 90. The slit period distance P includes a width W of the slit 90 and the slit pitch S (i.e., a width of the electrode strip 92). The extension direction of the electrode strip 92 is O2 direction, an initial arrangement direction of the liquid crystal molecules 93 (that is, an initial alignment direction of the liquid crystal molecules) is O1 direction, and a predetermined included angle α is formed between the O1 direction and the O2 direction. If the angle α is different, the transmittance and response time of liquid crystal molecules in the pixel unit are also different. The simulation study illustrates that the size of the included angle α is inversely related to the transmittance and the response time of the liquid crystal molecules. That is, the less the included angle α is, the higher the transmittance of the liquid crystal molecules is and the higher response time of the liquid crystal molecules is.

Figure 1E:
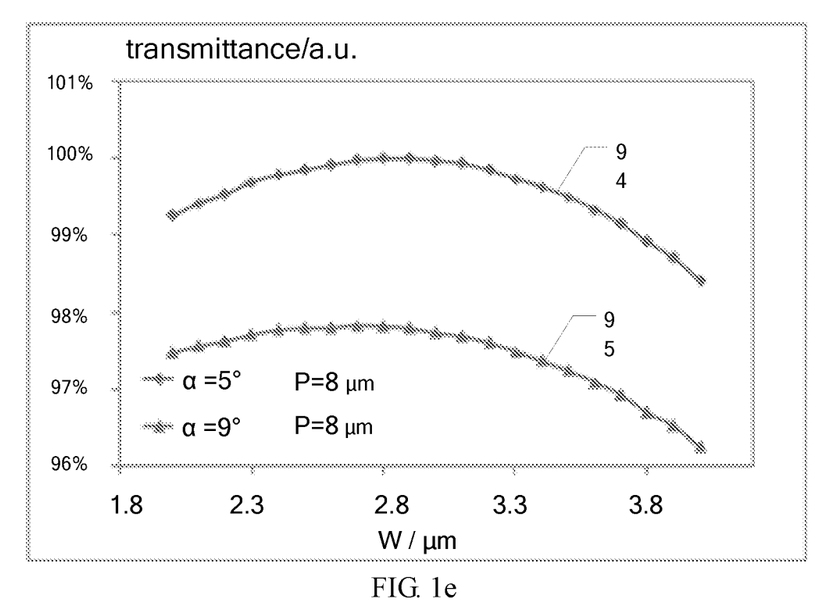
FIG. 1e is a schematic diagram of a simulated curve of transmittance of liquid crystal molecules at different included angles.

FIG. 1e illustrates a schematic diagram of a simulated curve of transmittance of liquid crystal molecules at different included angles. As illustrated in FIG. 1e, in a case where the slit period distance P is 8 µm, a curve 94 refers to the transmittance of liquid crystal molecules of the display panel upon the included angle α being 5° at different slit widths; a curve 95 refers to the transmittance of liquid crystal molecules of the display panel upon the included angle α being 9° at different slit widths. For example, in a case where the slit width W is 2.8 µm, upon the included angle α being 5°, the transmittance of liquid crystal molecules is approximately 100%, and the response time is approximately 26.36 ms; upon the included angle α being 9°, the transmittance of liquid crystal molecules is approximately 97.82%, and the response time is approximately 25.82 ms. Therefore, by changing the angle between the extension direction of the electrode strip in the different sub-pixel regions in the pixel unit and the initial arrangement direction of the liquid crystal molecules, the transmittance of the liquid crystal molecules in different sub-pixel regions can be changed, thereby adjusting brightness at the different sub-pixels, increasing the brightness uniformity of the display panel and improving the display quality.

At least one embodiment of the present disclosure provides an array substrate, a display panel, and a display device. The array substrate includes a base substrate and an alignment film located on the base substrate. The array substrate includes a plurality of pixel units. Each of the pixel units includes a first pixel region and a second pixel region. A first slit electrode is located in the first pixel region, and a second slit electrode is located in the second pixel region. The first slit electrode includes a plurality of first electrode strips, the second slit electrode includes a plurality of second electrode strips; the alignment film located in the first pixel region has a first alignment direction, and the alignment film located in the second pixel region has a second alignment direction; an extension direction of each of the plurality of first electrode strips and the first alignment direction have a first included angle, and an extension direction of each of the plurality of second electrode strips and the second alignment direction have a second included angle, the first included angle and the second included angle are both greater than or equal to 0° and less than or equal to 90°, and the first included angle is less than the second included angle.

In the array substrate, the included angles between the alignment direction of the alignment film and the extension direction of the electrode strip are different in different sub-pixel regions of the pixel unit, so that the included angle in a white sub-pixel region is larger than that in a color sub-pixel region, and under the premise of without changing the aperture ratio of each sub-pixel, the proportion of the brightness of the white sub-pixel to the overall brightness is reduced, thereby effectively improving the gray scale, improving the contrast and the display quality, increasing the product quality, and further improving display uniformity of the display panel adopting the array substrate.

Hereafter, several embodiments of the present disclosure will be described in detail, but the present disclosure is not limited to these specific embodiments.

Figure 2A:
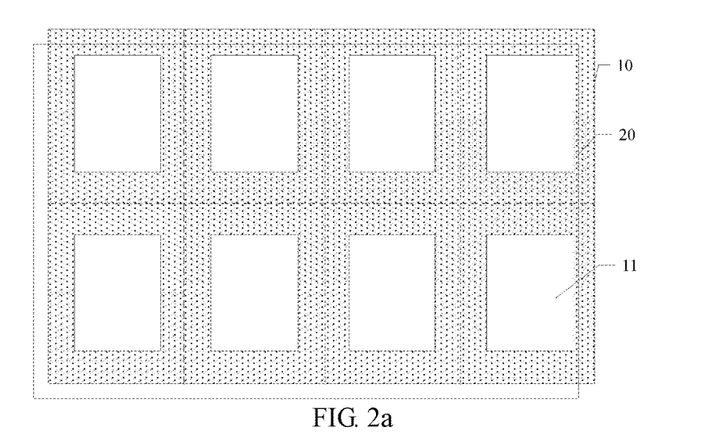
FIG. 2a is a schematic diagram of an array substrate provided by an embodiment of the present disclosure.

An embodiment of the present disclosure provides an array substrate. FIG. 2a illustrates a schematic diagram of an array substrate provided by an embodiment of the present disclosure, FIG. 2b illustrates a schematic structural diagram of a pixel unit of an array substrate provided by an embodiment of the present disclosure, and FIG. 2c illustrates a schematic structural diagram of a pixel unit of another array substrate provided by an embodiment of the present disclosure, and FIG. 2d illustrates a schematic structural diagram of a pixel unit of yet another array substrate provided by the embodiment of the present disclosure.

For example, as illustrated in FIG. 2a, an array substrate provided by an embodiment of the present disclosure includes a first base substrate 10 and an alignment film 20 located on the first base substrate 10. The array substrate includes a plurality of pixel units 11.

Figure 2B:
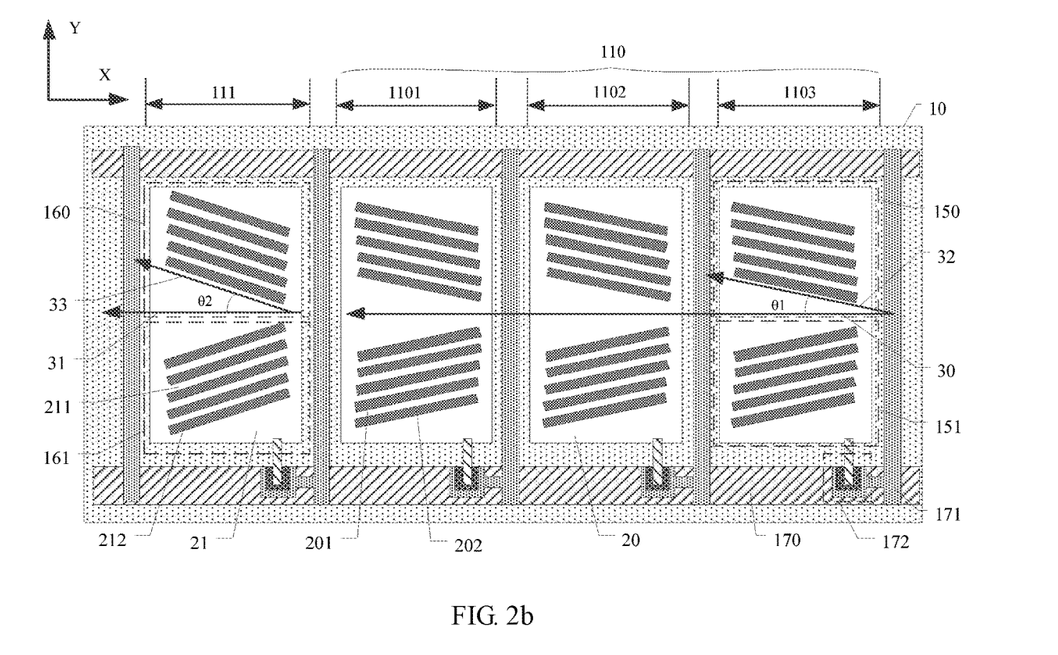
FIG. 2b is a schematic structural diagram of a pixel unit of an array substrate provided by an embodiment of the present disclosure.
Figure 2C:
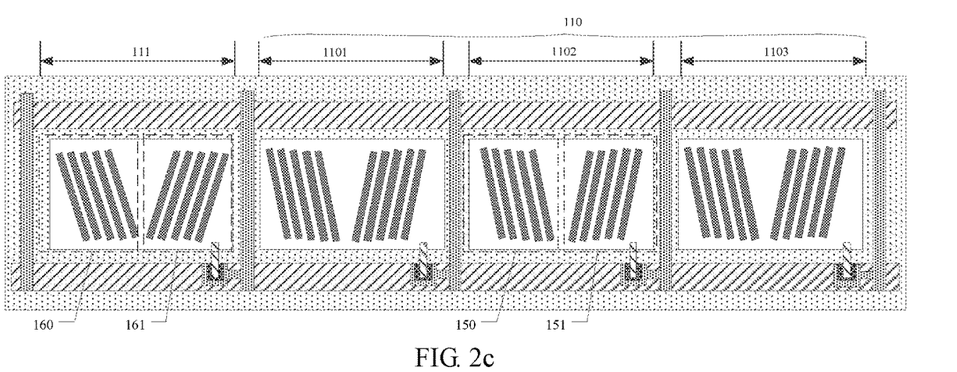
FIG. 2c is a schematic structural diagram of a pixel unit of another array substrate provided by an embodiment of the present disclosure.
Figure 2D:
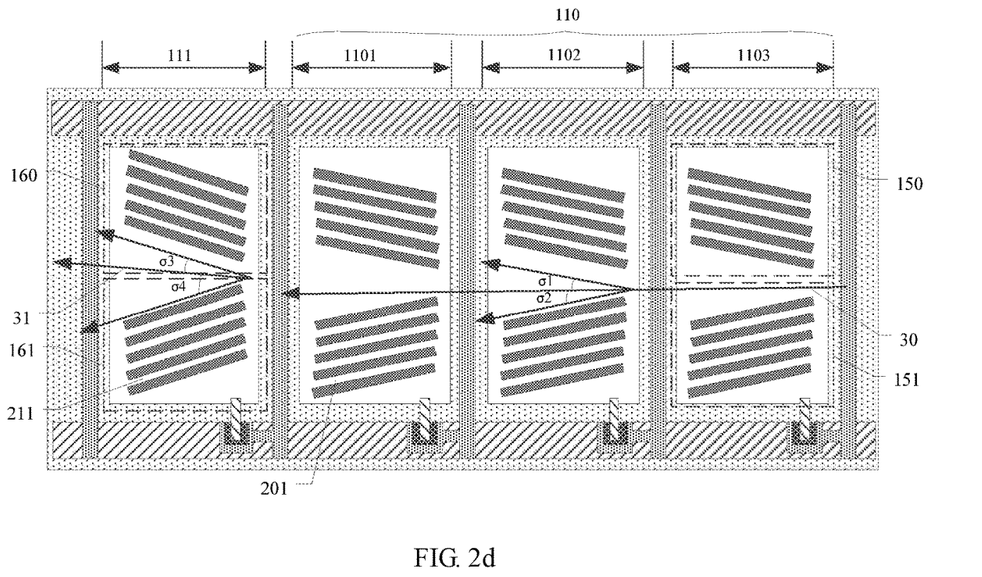
FIG. 2d is a schematic structural diagram of a pixel unit of yet another array substrate according to an embodiment of the present disclosure.

For example, as illustrated in FIG. 2b, each of the pixel units 11 includes a first pixel region 110 and a second pixel region 111. A first slit electrode 20 is located in the first pixel region 110, and a second slit electrode 21 is located in the second pixel region 111. The first slit electrode 20 includes a plurality of first electrode strips 201, and the second slit electrode 21 includes a plurality of second electrode strips 211. The alignment film 20 located in the first pixel region 110 has a first alignment direction 30, and the alignment film 20 located in the second pixel region 111 has a second alignment direction 31. An extension direction of each of the first electrode strips 201 is first direction 32, an extension direction of each of the second electrode strip 211 is second direction 33, and the first direction 32 and the first alignment direction 30 have a first included angle θ1, the second direction 33 and the second alignment direction 31 have a second included angle θ2. The first included angle θ1 and the second included angle θ2 are both greater than or equal to 0° and less than or equal to 90°, and the first included angle θ1 is less than the second included angle θ2.

For example, the plurality of the first electrode strips 201 are electrically connected with each other and adjacent first electrode strips 201 are spaced apart by a first slit 202. The plurality of the second electrode strips 211 are electrically connected with each other and adjacent second electrode strips 211 are spaced apart by a second slit 212.

For example, the first included angle θ1 and the second included angle θ2 respectively range from 0° to 15°.

For example, as illustrated in FIG. 2b, the first alignment direction 30 and the second alignment direction 31 are the same, and the extension direction of the first electrode strip 201 and the extension direction of the second electrode strip 211 are different, i.e., the first direction 32 is not parallel with the second direction 33.

For example, the first pixel region 110 is a color sub-pixel region, and the second pixel region 111 is a white sub-pixel region. The second included angle θ2 is greater than the first included angle θ1. That is, the included angle in the white sub-pixel region is greater than the included angle in the color sub-pixel region, and under the premise of without changing the aperture ratio of each sub-pixel, the proportion of brightness of the white sub-pixel in the overall brightness can be reduced, thereby effectively improving the gray scale, increasing the display quality and brightness uniformity, increasing the display contrast, and improving product quality.

For example, the color sub-pixel region can include a red sub-pixel region 1101, a green sub-pixel region 1102, and a blue sub-pixel region 1103. The red sub-pixel region 1101, the green sub-pixel region 1102, and the blue sub-pixel region 1103 can be arranged in the same row or in the same column, or can also be arranged in a triangular manner, etc., the embodiments of the present disclosure are not limited thereto.

For example, the extension direction of the first electrode strip 201 in the red sub-pixel region 1101, the extension direction of the first electrode strip 201 in the green sub-pixel region 1102, and the extension direction of the first electrode strip 201 in the blue sub-pixel region 1103 can be the same or different. After the white backlight passing through different filters, the absorptions of light by different filters are different, so that the extension direction of the electrode strip can be set according to the actual situation, so that the light transmittance of the display panel is more uniform and the display quality is further enhanced. For example, in a case where the filter parameters (e.g., film thickness, material, etc.) are the same, with respect to filters of red, green, and blue, the green filter has the highest transmittance, and the blue filter has the lowest transmittance, so that the extension direction of the first electrode strip 201 in the red sub-pixel region 1101, the extension direction of the first electrode strip 201 in the green sub-pixel region 1102, and the extension direction of the first electrode strip 201 in the blue sub-pixel region 1103 can be different. For example, the included angle between the extension direction of the first electrode strip 201 in the green sub-pixel region 1102 and the first alignment direction 30 is the largest, and the included angle between the extension direction of the first electrode strip 201 in the blue sub-pixel region 1103 and the first alignment direction 30 is the smallest.

It should be noted that the color sub-pixel region can also include sub-pixel region of other colors, such as a yellow sub-pixel region, a magenta sub-pixel region, and a cyan sub-pixel region. The color sub-pixel region can also include a monochrome sub-pixel region. The embodiments of the present disclosure are not limited thereto.

For example, the first slit electrode 20 and the second slit electrode 21 can be pixel electrodes, and can also be common electrodes.

For example, the material of the first slit electrode 20 and the second slit electrode 21 can be a transparent conductive material, a metal material, or other suitable material. For example, the transparent conductive material can be indium tin oxide (ITO), indium zinc oxide (IZO), indium oxide ($In_2O_3$), aluminum zinc oxide (AZO), carbon nanotubes, or the like.

For example, as illustrated in FIG. 2b, each sub-pixel region of the first pixel region 110 can include a first domain 150 and a second domain 151. The first electrode strip 201 of the first domain 150 is in mirror symmetry with the first electrode strip 201 of the second domain 151, and the symmetry axis thereof can be in X direction (for example, a horizontal direction). The second pixel region 111 can include a third domain 160 and a fourth domain 161. The second electrode strip 211 of the third domain 160 is in mirror symmetry with the second electrode strip 211 of the fourth domain 161, and the symmetry axis thereof is also in the X direction. In the array substrate provided by the embodiment of the present disclosure, a plurality of domains in one sub-pixel region are provided, and the electrode strips of the plurality of domains have different extension directions, thereby compensating the color deviation, suppressing the grayscale inversion, expanding the viewing angle, shortening the response time, and improving the product quality.

For example, each sub-pixel region of the first pixel region 110 can further include two other domains that are respectively in mirror symmetry with the first domain 150 and the second domain 151 in a Y direction (for example, a longitudinal direction). The sub-pixel region of the second pixel region 111 can further include two other domains that are in mirror symmetry with the third domain 160 and the fourth domain 161 in the Y direction. That is, each sub-pixel region of the pixel unit can form a four-domain structure with two symmetry axes and four different extension directions of the electrode strips, and the four-domain structure with two symmetry axes and four different extension directions of the electrode strips can further suppress grayscale inversion and color deviation, so that the compensation effect of light in each sub-pixel region is enhanced, thereby further improving display quality and improving product quality. It should be noted that, in one or more embodiments of the present disclosure, the multi-domain structure of each pixel unit is not limited to the above arrangement manner, nor is it limited to the number of the above-mentioned domains. For example, each sub-pixel region can also be an eight-domain structure or the like, and the eight domains can be arranged in one row, in one column, or in an array of a plurality of rows and columns, and the like. The embodiments of the present disclosure are not limited thereto.

For example, as illustrated in FIG. 2b, in each sub-pixel region, two domains are mirror-symmetrical with respect to the X direction, and embodiments of the present disclosure are not limited thereto. As illustrated in FIG. 2c, in each sub-pixel region, the two domains can also be mirror-symmetrical with respect to the Y direction. It should be noted that the extension directions of the electrode strip of the two domains is not limited to that illustrated in the figure.

For example, a material of the alignment film 20 can be polyimide or other suitable alignment material. For another example, an additive having good adhesive property can be added to the polyimide material to form an alignment film 20 having good adhesive property.

For example, the alignment film 20 can be formed by a method such as a polyimide immersion method, a printing method, or an inkjet method. The embodiments of the present disclosure are not limited thereto.

For example, the alignment film 20 can be aligned by using a rubbing alignment or a non-rubbing alignment technique. The non-rubbing alignment technique can avoid the unfavorable problems of the alignment film caused by the mechanical rubbing method, and the non-rubbing alignment technique can include, for example, photo-alignment, ion beam alignment, and the like. For example, in one embodiment, the alignment film 20 can be aligned by photo-alignment. That is, the alignment film 20 is irradiated with polarized ultraviolet light, the alignment layer 20 produces anisotropy due to the photochemical reaction (e.g., such as dimerization reaction, decomposition reaction, isomerization reaction, photo alignment reaction, etc.) so that the alignment film 20 has the alignment ability. In order to achieve a stable state with minimal energy, the liquid crystal molecules can interact with molecules on the surface of the alignment film 20 so that the liquid crystal molecules are aligned along a direction of a maximum force defined by the photo-alignment. Photo-alignment has the advantages of avoiding contamination of the surface of the substrate, enabling small-area alignment, specific pattern alignment through a mask, and the like.

For example, in one example of an embodiment of the present disclosure, the first alignment direction 30 can be not parallel with the second alignment direction 31, and the extension direction of the first electrode strip 201 can be not parallel with the extension direction of the second electrode strip 211.

For example, the alignment film in the first pixel region 110 and the alignment film in the second pixel region 111 can be respectively aligned by using a photo-alignment technique so that the first alignment direction 30 is not parallel with the second alignment direction 31.

For example, as illustrated in FIGS. 2b and 2c, for an array substrate having a dual-domain structure, the alignment films 20 can have the same alignment direction or can have different alignment directions in two sub-regions corresponding to two domains in each sub-pixel region.

For example, the alignment direction of the alignment film 20 in the region corresponding to the first domain 150 and the alignment direction of the alignment film 20 in the region corresponding to the second domain 151 can be in mirror symmetry, and the symmetry axis thereof can be a symmetry axis of the first domain 150 and the second domain 151, so that in each sub-pixel region of the second pixel region 111, the angle between the extension direction of the first electrode strip 201 of the first domain 150 and the alignment direction of the alignment film 20 is the same as the angle between the extension direction of the electrode strip 201 of the second domain 151 and the alignment direction of the alignment film 20. Similarly, in the two sub-regions corresponding to the third domain 160 and the fourth domain 161, the alignment directions of the alignment films 20 can also be symmetrical, as long as the first included angle θ1 is less than the second included angle θ2. and the present disclosure is not limited thereto.

It should be noted that, the first included angle θ1 can refer to, in the first pixel region 110, an included angle between the extension direction of the first electrode strips 201 in each domain and the alignment direction of the alignment film 20, and the second included angle θ2 can refer to, in the second pixel region 111, an included angle between the extension direction of the second electrode strips 211 in each domain and the alignment direction of the alignment film 20. That is, the first included angle θ1 can include a plurality of angles, and the second angle θ2 can also include a plurality of angles.

For example, as illustrated in FIG. 2d, for the dual domain structure, in the two sub-regions corresponding to the first domain 150 and the second domain 151, the alignment directions of the alignment films 20 can both be the first alignment direction 30. In the two sub-regions corresponding to the third domain 160 and the fourth domain 161, the alignment directions of the alignment films 20 can both be the second alignment direction 31. The first alignment direction 30 is not parallel with the second alignment direction 31. An included angle between the extension direction of the first electrode strip 201 of the first domain 150 and the alignment direction of the alignment film 20 is σ1, and an included angle between the extension direction of the first electrode strip 201 of the second domain 151 and the alignment direction of the alignment film 20 is σ2, and the first included angle θ1 can include σ1 and σ2. The included angle between the extension direction of the second electrode strip 211 of the third domain 160 and the alignment direction of the alignment film 20 is σ3, the extension direction of the second electrode strip 211 of the fourth domain 161 and the alignment direction of the alignment film 20 is σ4, and the second included angle θ2 can include σ3 and σ4. The first included angle θ1 is less than the second included angle θ2, i.e., σ1 is less than σ3 and σ4, and σ2 is also less than σ3 and σ4.

For example, in an example of an embodiment of the present disclosure, the extension direction of the first electrode strip 201 and the extension direction of the second electrode strip 211 can be the same. That is, the first direction 32 and the second direction 33 are parallel with each other (that is, the same or having an angle difference of 180°), and the first alignment direction 30 and the second alignment direction 31 are different. That is, the first alignment direction 30 is not parallel with the second alignment direction 31, as long as the first included angle θ1 is less than the second included angle θ2.

For example, as illustrated in FIG. 2b, the first base substrate 10 is further provided with a data line 171 and a gate line 170. The data line 171 extends in the Y direction. The gate line 170 extends in the X direction. The pixel units are located in regions defined by data lines and gate lines which are intersected with each other. For example, a thin film transistor 172 is located at a position which is close to an intersection of the data line 171 and the gate line 170, and the thin film transistor 172 can serve as a switching element of the pixel unit.

For example, a material of the data line 171 and/or the gate line 170 can include a copper-based metal, an aluminum-based metal, a nickel-based metal, or the like. For example, the copper-based metal is a stable copper-based metal alloy such as copper (Cu), copper-zinc alloy (CuZn), copper-nickel alloy (CuNi), or copper-zinc-nickel alloy (CuZnNi).

For example, the thin film transistor 172 can be an oxide thin film transistor, an amorphous silicon thin film transistor, a polysilicon thin film transistor, or the like.

For example, the first base substrate 10 can be a transparent insulation substrate, and the transparent insulation substrate can include, for example, a glass substrate, a quartz substrate, a plastic substrate, or other suitable substrate.

Figure 3:
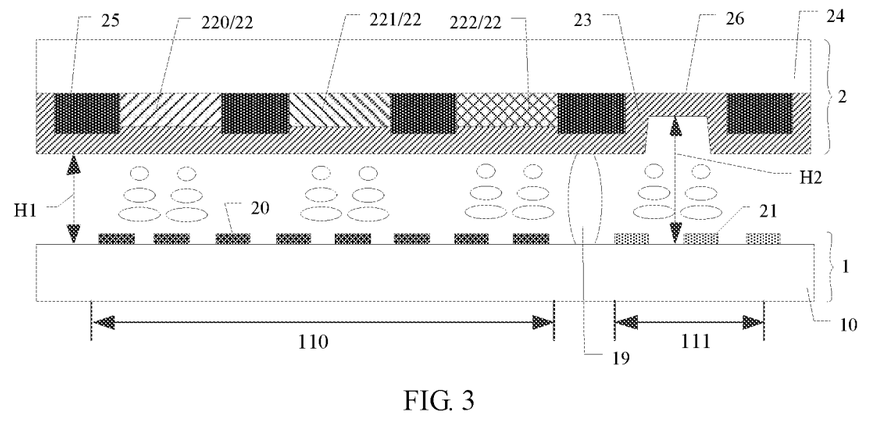
FIG. 3 is a schematic structural diagram of a section of a display panel provided by an embodiment of the present disclosure.

The embodiment of the present disclosure provides a display panel. FIG. 3 illustrates a schematic cross-sectional view illustrating a structure of a display panel provided by an embodiment of the present disclosure.

For example, as illustrated in FIG. 3, the display panel includes a first display substrate 1 and a second display substrate 2. The first display substrate 1 is the array substrate described in any one of the above embodiments. Therefore, the display panel can make the transmittance and the response time upon the first pixel region being displayed higher than the transmittance and the response time upon the second pixel region being displayed without changing the aperture ratio of each sub-pixel, thereby reducing the proportion of the brightness of the white sub-pixels in the second pixel region to the overall brightness, improving the gray scale effectively, improving the display contrast and the display quality, increasing the display brightness uniformity of the display panel, and increasing the product quality.

For example, the first display substrate 1 can include a first base substrate 10, a first slit electrode 20 and a second slit electrode 21 located on the first base substrate 10, and a first alignment film (not illustrated) on the first slit electrode 20 and the second slit electrode 21. The first slit electrode 20 is located in the first pixel region 110, and the second slit electrode 21 is located in the second pixel region 111. The first slit electrode 20 and the second slit electrode 21 can be pixel electrodes. They can also be common electrodes.

For example, the second display substrate 2 is a color filter substrate. The second display substrate 2 can include a second base substrate 24. In a direction perpendicular to the second base substrate 24, a position of the second base substrate 24 corresponding to the first pixel region 110 is a color light region. In addition, a filter layer 22 can be provided in the color light region. A position of the second base substrate corresponding to the second pixel region 111 is a white light region. The color sub-regions of the color light region, and the color light region and the white light region can be both spaced apart by the black matrix 25.

For example, the filter layer 22 can include a red filter sub-layer, a green filter sub-layer, and a blue filter sub-layer. The red filter sub-layer, the green filter sub-layer, and the blue filter sub-layer are respectively provided with a red filter 220, a green filter 221, and a blue filter 222. Thus, different filter sub-layers in the filter layer 22 can absorb different colors of light in the backlight to achieve full-color display.

For example, a material of the red filter 220, the green filter 221, and the blue filter 222 can be a photoresist or other suitable material containing different color pigments or dyes.

For example, the red filter 220, the green filter 221, and the blue filter 222 can be fabricated by a method such as a dyeing method, a pigment dispersion method, a printing method, or an ink jet method.

For example, the filter sub-layers in the filter layer 22 are not limited to the filter sub-layers of three colors of red (R), green (G), and blue (B). The filter layer 22 can also be a filter layer of other colors or a monochrome filter layer. For example, the filter layer 22 can include a cyan filter sub-layer, a magenta filter sub-layer, a yellow filter sub-layer, and the like, and corresponding filters can be located on the filter sub-layers of different colors to meet the requirements of different color displays. The color of the filter of the filter sub-layer in the filter layer 22 can be designed in various ways according to specific requirements, which is not limited by the embodiments of the present disclosure.

For example, the second display substrate 2 further includes a planarization layer 23 located on the filter layer 22. The planarization layer 23 can protect the filter layer 22 and realize surface planarization of the second display substrate 2. The planarization layer 23 can cover an entire display region of the second base substrate 24 so that the planarization layer 23 can fill the white light region and the color light region. The aperture part 26 of the white light region is directly filled with the planarization layer 23 and the aperture part of the color light region is filled with the filter layer 22 and the planarization layer 23. Therefore, the transparent material separately filling of the aperture part 26 of the white light region is omitted, a mask plate is saved, thereby saving the production cost, reducing the production time, and increasing the production capacity.

For example, a material of the planarization layer 71 can include silicon nitride (SiNx), silicon oxide (SiOx), silicon oxynitride (SiNxOy), or other suitable material.

For example, a distance between a surface of the planarization layer 23 corresponding to the first pixel region 110 and a surface of the first base substrate 10 facing the second display substrate 2 is H1, and a distance between a surface of the planarization layer 23 corresponding to the second pixel region 111 and a surface of the first base substrate 10 facing the second display substrate 2 is H2, and H1 is less than or equal to H2.

It should be noted that, at the aperture part 26 of the white light region, a light-transmitting layer can be filled first, and then a planarization layer 23 can be located on the light-transmitting layer and the filter layer 22 to reduce cell thickness difference of the first pixel region 110 and the second pixel region 111, reduce transmittance difference of the first pixel region 110 and the second pixel region 111, improve the contrast, and increase the image display quality. For example, a film thickness of the light-transmitting layer can be the same as that of the filter layer 22, so that H1 is equal to H2.

For example, the second display substrate 2 can further include a second alignment film (not illustrated). An alignment direction of the first alignment film on the first display substrate 1 and an alignment direction of the second alignment film are parallel with each other, so that the display panel is in the normally black mode under the condition that no voltage is applied. For example, the alignment direction of the first alignment film is the same as or 180° away from the alignment direction of the second alignment film.

For example, a spacer 19 can further be provided on the planarization layer 23 to maintain the uniformity of the thickness of the liquid crystal cell. A material of the spacer 19 can be a suitable material such as a UV curable acrylic resin. The spacer 19 can have a columnar shape, a spherical shape, or the like.

An embodiment of the present disclosure provides a display device including any one of the above-mentioned display panels, and can further include a gate driving circuit, a data driving circuit, a backlight, and the like.

For example, the display device can be a liquid crystal display and any products or components having a display function such as a television, a digital camera, a mobile phone, a watch, a tablet, a notebook computer, a navigator, or the like including these display devices.

With respect to the present disclosure, the following statements should be noted.

(1) The accompanying drawings involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thicknesses of layers or regions are enlarged or reduced, i.e., these drawings are not drawn to actual scale.

(3) In case of no conflict, features in one embodiment or in different embodiments can be combined.

The foregoing descriptions are merely specific embodiments of the present disclosure, but the scope of protection of the present disclosure is not limited thereto, and the scope of protection limited by the disclosure should be defined in the protection scope of the claims.

What is claimed is:

1. An array substrate comprising:
a base substrate and an alignment film located on the base substrate,
wherein, the array substrate comprises a plurality of pixel units, each of the plurality of pixel units comprises a first pixel region and a second pixel region, and a first slit electrode is located in the first pixel region, a second slit electrode is located in the second pixel region, the first slit electrode comprises a plurality of first electrode strips, and the second slit electrode comprises a plurality of second electrode strips;
the alignment film located in the first pixel region has a first alignment direction, and the alignment film located in the second pixel region has a second alignment direction;
the first pixel region is a color sub-pixel region, and the second pixel region is a white sub-pixel region,
the first pixel region comprises a first domain and a second domain, and the second pixel region comprises a third domain and a fourth domain, the plurality of first electrode strips of the first domain is in mirror symmetry with the plurality of first electrode strip of the second domain, and the plurality of second electrode strip of the third domain is in mirror symmetry with the plurality of second electrode strip of the fourth domain,
an extension direction of each of the plurality of first electrode strips in the first domain and the first alignment direction have a first included angle, an extension direction of each of the plurality of first electrode strips in the second domain and the first alignment direction have a second included angle, the first included angle is equal to the second included angle,
an extension direction of each of the plurality of second electrode strips in the third domain and the second alignment direction have a third included angle, an extension direction of each of the plurality of second electrode strips in the fourth domain and the second alignment direction have a fourth included angle, the third included angle is smaller than the fourth included angle, and the third included angle is larger than the first included angle,
the first included angle, the second included angle, the third included angle, and the fourth included angle are both greater than or equal to 0° and less than or equal to 90°.

2. The array substrate according to claim 1, wherein the extension direction of each of the plurality of first electrode strips is the same as the extension direction of each of the plurality of second electrode strips.

3. The array substrate according to claim 1, wherein the extension direction of each of the plurality of first electrode strips and the extension direction of each of the plurality of second electrode strips are different, and the first alignment direction and the second alignment direction are different.

4. The array substrate according to claim 1, wherein the color sub-pixel region comprises any one selected from the group consisting of a red sub-pixel region, a green sub-pixel region, and a blue sub-pixel region.

5. The array substrate according to claim 4, wherein the extension direction of each of the plurality of first electrode strips in the red sub-pixel region, the extension direction of each of the plurality of first electrode strips in the green sub-pixel region, and the extension direction of each of the plurality of first electrode strips in the blue sub-pixel region are the same.

6. The array substrate according to claim 1, wherein the first slit electrode and the second slit electrode are pixel electrodes.

7. A display panel, comprising: a first display substrate and a second display substrate, wherein the first display substrate is the array substrate according to claim 1.

8. The display panel according to claim 7, wherein the second display substrate is a color filter substrate, and in a direction perpendicular to the second display substrate, a filter layer is provided at a position of the second display substrate corresponding to the first pixel region.

9. The display panel according to claim 8, wherein the second display substrate further comprises a planarization layer located on the filter layer.

10. The display panel according to claim 9, wherein a distance between a surface of the planarization layer corresponding to the first pixel region and a surface of the base substrate facing the second display substrate is less than or equal to a distance between a surface of the planarization layer corresponding to the second pixel region and a surface of the base substrate facing the second display substrate.

11. The display panel according to claim 8, wherein the filter layer comprises a red filter sub-layer, a green filter sub-layer, and a blue filter sub-layer.

12. A display device, comprising the display panel according to claim 7.

* * * * *

UNITED STATES PATENT AND TRADEMARK OFFICE
CERTIFICATE OF CORRECTION

PATENT NO. : 11,378,847 B2
APPLICATION NO. : 15/778440
DATED : July 5, 2022
INVENTOR(S) : Liangliang Jiang et al.

Page 1 of 1

It is certified that error appears in the above-identified patent and that said Letters Patent is hereby corrected as shown below:

On the Title Page

Item (73) the second Assignee:
HEFEI XINSHENG OPTOELECTRONICS TECHNOLOGY CO., LTD, Anhui (CN)

Is changed to:
HEFEI XINSHENG OPTOELECTRONICS TECHNOLOGY CO., LTD., Anhui (CN)

Signed and Sealed this
Eighth Day of October, 2024

Katherine Kelly Vidal
*Director of the United States Patent and Trademark Office*